Figure 1:
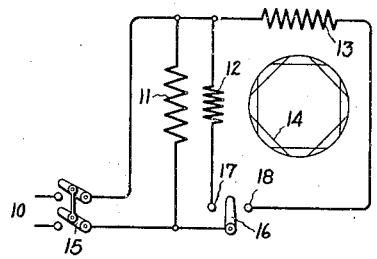

Oct. 31, 1933.   W. J. MORRILL   1,933,497
WOUND ROTOR REACTOR MOTOR
Filed Sept. 29, 1931

Inventor:
Wayne J. Morrill,
by Charles E. Mullen
His Attorney.

Patented Oct. 31, 1933

1,933,497

UNITED STATES PATENT OFFICE 1,933,497

WOUND ROTOR REACTOR MOTOR

Wayne J. Morrill, Fort Wayne, Ind., assignor to General Electric Company, a corporation of New York Application September 29, 1931
Serial No. 565,818

18 Claims. (Cl. 172—278)

My invention relates to alternating current motors of the type adapted to be energized from a single phase source and to start by reason of a split phase action. One object of the invention is to provide a motor of the type referred to which has a high starting torque with a relatively small starting current. Another object of the invention is to provide a split phase motor requiring no external phase splitting means.

In carrying my invention into effect, I provide a single phase motor in which the phase splitting action is obtained by a reactor built within the motor and comprising the windings thereof. The primary of the motor has main and starting windings, and the secondary has a winding which may consist of individual short-circuited coils or a phase winding consisting of several coils short-circuited on themselves in series. The starting winding is preferably of the conventional type displaced at a suitable angle, such as 90 degrees, from the main primary winding. The main primary winding is preferably wound in at least two sections having the same flux axis but producing differently shaped flux waves which when combined approximate a sine wave which substantially completely links with the coil wound secondary winding. For starting, only one section of the main primary winding is energized with the starting winding. At this time the flux wave produced by the energized section of the main winding is such that the secondary winding does not link completely therewith. The result is that the effective reactance of the energized section of the main primary winding is high, producing the desired phase split between it and the starting winding and holding the starting current down to a relatively low value. When the motor comes up to speed, both sections of the main primary winding are connected in parallel and the starting winding is preferably cut out. The primary winding flux wave is now changed so as to substantially completely link with the secondary winding, resulting in low reactance and efficient running operation.

If desired, the invention may be used in conjunction with a condenser in the starting winding circuit, and such starting winding circuit may be cut out or left in with a reduced value of capacity for running operation.

The motor in its simplest form is an excellent motor for operating such appliances as washing machines. In this and similar applications it is desirable to keep the starting current down to a low value. In some instances this has been accomplished to some extent heretofore by employing a clutch and connecting the motor to its load only after it has come up to speed. In other instances an external condenser or a reactance has been employed in the starting winding circuit.

By means of my invention I obtain a sufficient starting torque with a low allowable starting current to make a clutch or external phase splitting means unnecessary. For example, by means of the present invention it is feasible to build a 110 volt split phase motor rated ¼ horse power having 450 watts maximum output and 150% starting torque, with a locked rotor current not exceeding 20 amperes, without employing external phase splitting auxiliaries.

Figure 2:
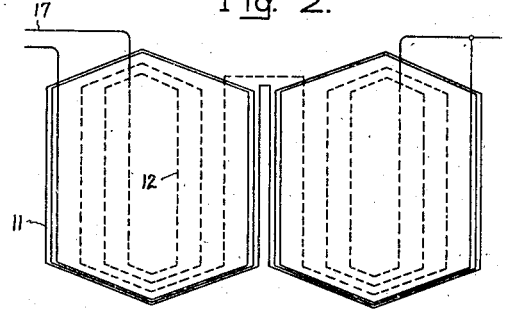
Figure 5:
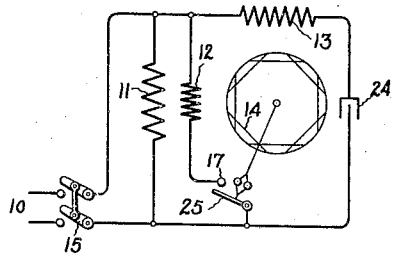
Figure 3:
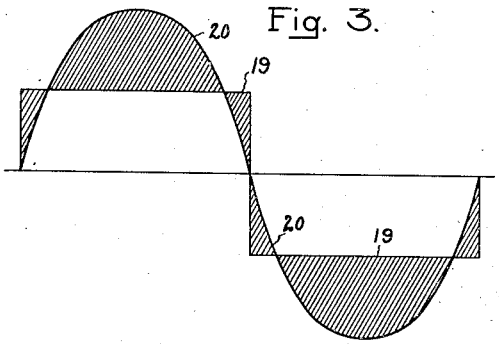
Figure 6:
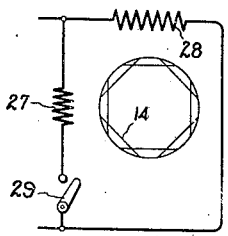
Figure 7:
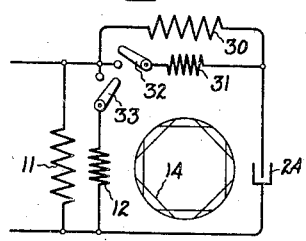
Figure 4:
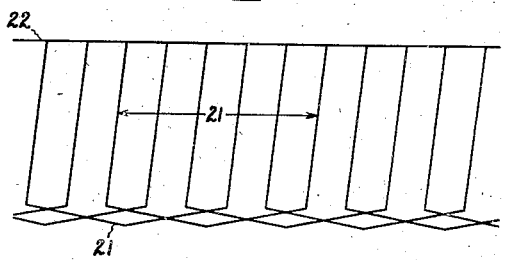

The features of the invention which are believed to be novel and patentable will be pointed out in the claims appended hereto. For a better understanding of the invention, reference will be made in the following description to the accompanying drawing, which represents in Fig. 1 a circuit diagram of a motor to which the invention is applied; Fig. 2 represents a preferred arrangement of the two sections of the main primary winding; Fig. 3 represents flux waves, which will be referred to in explaining the invention; Fig. 4 represents a preferred form of secondary winding for use with a motor having main primary windings disposed as in Fig. 2; Fig. 5 represents the circuit arrangement of the motor of my invention as employed with a condenser in the starting winding circuit; Fig. 6 represents a simple modification where the starting reactance is incorporated in the starting winding, and Fig. 7 represents a condenser motor in which the internal inductive reactance of my invention is employed in series with a condenser to raise the voltage in the condenser due to resonance.

Referring now briefly to Fig. 1, I have here represented a circuit diagram of a motor embodying my invention in simple form as arranged for connection to a single phase supply represented at 10. The primary of the motor has the main winding in two sections 11 and 12 and the starting winding 13 displaced from the axis of the main winding by 90 electrical degrees. The secondary winding, which is preferably, although not necessarily, on the rotor, is represented at 14. The nature and disposition of the main primary winding and the secondary winding will be more fully explained in connection with Figs. 2 and 4, respectively. In Fig. 1, 15 represents a line switch, and 16 a switch for changing the motor connections between starting and running conditions. It will be noted that when switch 15 is closed, section 11 of the main winding is energized, and this section is energized both for starting and running operation. The starting connection of the motor is with switch 16 to the right on contact 18 which connects the starting winding 13 in parallel with main winding section 11 across the line, at which time section 12 of the main winding is inactive. It will be noted that the sections 11 and 12 of the main winding are wound in the same axis, but are of different pitch and distribution. They have the same effective number of turns and so may be connected in parallel for running without causing circulating currents between them. For best efficiency these windings will also have approximately equal amounts of copper.

When main winding section 11 is used without section 12 during the starting period, the flux wave produced thereby is of such character as to link only partially with the secondary winding, the latter being of such form and pitch as to accomplish this purpose. Winding section 11, therefore, acts in part as an inductive reactance to reduce the starting current and at the same time producing a good phase split with respect to the starting winding. Thus we obtain good starting torque with a relatively low starting current, approximating the conditions obtained with an ordinary reactor motor with an external reactor.

For running, the switch 16 is thrown to the left on contact 17. This opens the starting winding circuit and connects main winding section 12 in parallel with section 11. The two main winding sections together produce a resultant flux wave which almost completely links with the secondary winding, and we thus obtain excellent running conditions.

In Fig. 2, I have represented a relation and disposition of the two main winding sections which when used with a secondary winding such as represented in Fig. 4 will accomplish the results above described. In Fig. 2 the starting winding has not been shown, as it is no different from the conventional starting winding; but it will be recognized that it will be displaced from the main winding axis by a suitable angle, such as 90 electrical degrees. Fig. 2 thus represents the main winding for a two-pole motor comprising sections 11 and 12. Section 11, shown in full lines, is a full pitch coil, all turns of which embrace the same or substantially the same peripheral portion of the stator iron. This section will, therefore, produce a uniform flux across the pole, which we may term a square flux wave and which we may represent as at 19 in Fig. 3. It will be understood that the drawing is made from the standpoint of clearness, and that it may not represent the exact disposition of the coils of a commercial motor, but sufficiently so to explain the idea of the invention.

Section 12 of the main winding, shown in dash lines, is distributed within the area embraced by the full pitch coil section 11 and produces a flux which when combined with the square wave flux 19 of section 11 produces a resultant flux which approaches the sine wave 20 of Fig. 3.

Referring now to Fig. 4, which represents the preferred form of secondary winding, and which is preferably the rotor winding. This winding is made up of a number of individual short-circuited coils 21 with one coil per slot. In order to reduce the insulation required and to simplify the making of connections, all of the coils are brought out at one end and connected together by a low resistance end ring 22. The resistance of the common end connection 22 is made very low so that the coils are electrically independent of each other, for the reason that the only voltage which can be induced in one coil through the action of another is due to the resistance drop in the end connection. The currents in different coils will therefore not produce mutual voltages. The coils are between two-thirds and four-fifths the pitch of the full pitch coil section 11 of the primary, and the coil sides are preferably spiraled in the rotor slots, as indicated. The exact number of such coils is not important from the standpoint of the present invention, but should be such as to give minimum locking tendency at start and reasonably quiet operation by the proper selection of the relative number of primary and secondary slots.

This arrangement of the secondary winding is such that only the fundamental sinusoidally distributed component of the square flux wave links with the secondary at start. The secondary is non-inductive to fluxes not of fundamental sinusoidal distribution, and that portion of the square wave air gap flux not of fundamental sinusoidal distribution links only with the primary winding itself and produces the effect of leakage reactance and affects the motor only as series reactance in the main winding at start.

The reason why this rotor winding produces this result and links only with the fundamental flux component may be explained as follows: If we consider the primary flux as composed only of the three largest harmonics, namely the fundamental, third and fifth harmonics, it will be clear that we can pitch the rotor winding in such a way that the third harmonic cannot induce any voltage in the rotor coils. This can be done by making the rotor coils two-thirds of full pitch. When this is done the conductor on one side of the rotor coil is cutting the same magnitude and direction of third harmonic flux as the conductor on the other side of the same coil, and consequently the two voltages cancel each other and no resulting voltage is generated. In the same way we may eliminate the fifth harmonic as a voltage producing factor in the rotor winding by pitching the rotor coils four-fifths of full pitch. If instead of making the pitch of the rotor coils exactly two-thirds or four-fifths, we compromise on some intermediate value, it is possible to eliminate the effect of the third and fifth harmonic almost entirely. Thus, a preferred rotor coil pitch which I have employed successfully for this purpose is about ten-fourteenths, and this is the preferred pitch of the rotor coils for this particular form of winding.

When this has been done the only harmonics which can effect the rotor materially are the fundamental and the higher harmonics. The higher harmonics can be eliminated to a very large extent by suitably spiraling the rotor conductors, as is well understood, and consequently I preferably spiral the conductors as represented in Fig. 4 and obtain a rotor which is substantially non-inductive to all harmonics of the primary flux, except the fundamental.

It will be evident that I might employ a standard phase wound secondary, instead of the individual coil arrangement described, if I connected the coils of the same phase in a series short circuit and otherwise arranged pitch and spiral as above described. However, the winding shown in Fig. 4 has advantages over other forms of windings in that it has relatively low reactance and the voltage is as low as possible, which reduces the necessity of careful insulation and makes it possible to wind the secondary very economically by inserting the coils from one end of the rotor simultaneously and joining them at the other end with a common end ring.

From the above it will be evident that during the starting period the secondary winding will not completely link with the square flux wave 19 of Fig. 3, but when both sections of the main winding are energized the secondary winding will substantially fully link with the sine wave flux 20 of Fig. 3. Thus at starting there is a high leakage flux between the active portion of the main primary winding and secondary which may be approximately represented by the cross-sectioned area between curves 19 and 20 of Fig. 3. This leakage flux produces reactance in the main winding section 11 during the starting period, which leakage reactance is effective in reducing the starting current taken by this winding and in producing a desirable phase split between the current taken by this winding section and that of the starting winding. When the distributed main winding section 12 is connected in parallel with section 11 for running conditions, the reactance which is proportional to the difference between the area of the square and sine waves 19 and 20 of Fig. 3 largely disappears, since now the resultant main winding flux is more nearly of the correct shape to completely link with the secondary winding. In general, it is not feasible in small motors to obtain complete elimination of leakage reactance. However, by the use of windings in primary and secondary such as I have represented it is possible to obtain results as good as those obtained with ordinary split phase reactor motors where a separate external reactor is used and the motor windings are designed for minimum leakage reactance. The form of secondary winding shown does not materially increase the leakage reactance between the secondary and usual form of sinusoidally distributed starting winding.

I do not wish to confine my invention to the particular disposition of windings described above, since it will be evident to those skilled in the art, after becoming familiar with the principles disclosed herein, that a variety of different winding arrangements may be devised to accomplish the same general results.

In Fig. 5 I have represented the invention as applied to a condenser motor. The parts similar to those previously described are indicated by like reference characters, and the description need not be repeated. Here a condenser 24 is contained in the starting winding circuit.

In condenser motors a condenser has been employed to obtain the desired phase split at start, and in many cases the condenser circuit has been left in for running to improve the power factor of the motor. In such cases it has been desirable to reduce the capacitance effect between starting and running conditions, because the capacity needed for phase split is ordinarily greater than needed for the running power factor correction. This involved some means for adjusting the capacitance effect between starting and running conditions. The same beneficial results may be approached by using my invention in combination with a condenser in the starting winding circuit, but without the necessity of making any adjustment of the condenser or providing apparatus therefor. In Fig. 5, a portion of the desired phase split is obtained by my invention and a portion by the condenser 24, so that the condenser may be of reduced size and cost and only large enough for the desired power factor correction during running. After selecting the desired condenser for power factor correction, the remainder of the phase split desired at start may be obtained by adding the proper amount of reactance effect in the main winding section by means of my invention. The starting winding is left in circuit for running, but the starting reactance in the main winding is eliminated by connecting main winding section 12 in parallel with section 11 after the starting operation. Here I have shown an automatic switch 25 operated by a centrifugal governor for performing this operation. Where a condenser is desirable, either for use at starting or for both starting and running and whether adjustable or not, the phase split produced by my internal reactor makes it possible to reduce the motor starting current and the size and cost of the condenser that would otherwise be necessary to accomplish an equivalent phase split by the condenser alone.

In Fig. 6 I have represented a simple embodiment of my invention, where primary winding 27 and secondary winding 14 may be designed similar to main winding section 11 of Fig. 2 and the secondary winding of Fig. 4, respectively, so as to have high leakage reactance whenever winding 27 is energized. Winding 28 is a normal distributed primary winding to give a sinusoidal flux distribution and is displaced at 90 electrical degrees or thereabout from winding 27. Here winding 27 may be considered the starting winding and 28 the running winding. The motor is started by energizing both windings in parallel. Winding 27, in addition, to producing a certain amount of sine wave flux component which links with the secondary winding to produce torque, has a non-sinusoidal flux component which acts as a series reactor to produce the necessary phase split and reduces the starting current. After the motor is started this winding 27 is simply opened at switch 29, after which the motor runs as a normal single phase motor. This motor is suitable in applications requiring heavy starting duty and light running duty such that winding 28 may be designed with relatively high resistance and not take an excessive current at start.

In Fig. 7, I have represented a capacitor motor where inductive reactance is included in the starting winding in accordance with the principles hereinbefore described, which inductive reactance is connected in series with a condenser to raise the voltage on the condenser due to a resonance effect. The main winding of the motor is the same as in Figs. 1 and 5, and is intended to be used in the same way as described in connection with Figs. 1 and 5. The starting winding may also be made in two sections 30 and 31, the former section being designed to produce high leakage fluxes when used alone. After the motor has been started, winding section 31 may be closed by means of switch 32 to reduce the inductive reactance of the starting winding to normal. The reactance of the main winding is reduced by closing switch 33 after the starting operation.

In this modification, the inductive reactance effect of the starting winding obtainable by winding section 30 is not used for phase split, but is used to produce a resonance effect with condenser 24, to thereby raise the voltage across the condenser to a much higher value than would otherwise be possible without using a transformer. Preferably, the capacity reactance in the starting winding circuit is somewhat greater than the inductive reactance produced by winding 30, so that the condenser assists in the phase split and improves the power factor. For running, section 31 of the starting winding, when provided, may be connected in parallel with section 30 to reduce the inductive reactance of the starting winding to normal. The resonance condition is thereby eliminated resulting in normal condenser motor running conditions.

The advantage of this arrangement lies in the fact that I can economically raise the voltage on a low cost condenser at start, or during both starting and running conditions, without using an external auto-transformer or its equivalent. Other arrangements of the same principle will occur to those skilled in the art without discussing all of the various combinations where such a scheme would be useful.

Having thus described the principle of operation of my invention, and the preferred embodiments thereof, I now seek claims commensurate with the scope of the invention and which are not limited to the particular embodiments which I have chosen as illustrations thereof.

What I claim as new and desire to secure by Letters Patent of the United States, is:

1. A single phase motor comprising a primary member having windings displaced at an angle to each other, means for energizing said windings in parallel for starting purposes, and a relatively rotatable secondary member having a magnetic core and secondary winding, said primary windings being in close inductive relation to the magnetic core of the secondary member and wound to produce fluxes therein of the same pole number but of different wave shape, the secondary winding having a distribution such as to be inductively linked with the primary fluxes produced by the two primary windings to a materially different degree, whereby a phase displacement in the currents supplied to the primary windings is produced to start the motor.

2. A single phase motor comprising a primary member having windings displaced at an angle to each other, means for energizing said windings in parallel for starting purposes, a relatively rotatable secondary member having a magnetic core in close inductive relation with both primary windings and a secondary winding which substantially completely links with the secondary flux produced by one of said primary windings and only partially inductively links with the secondary flux produced by the other of said primary windings during starting, whereby the last mentioned primary winding acts as a reactor to reduce the starting current of the motor and to produce a phase split between the currents supplied to the primary windings.

3. A single phase motor having a secondary core and winding and a relatively rotatable primary member having two primary windings displaced at an angle to each other and in similar inductive relation to the secondary core, one of said primary windings being designed for low leakage reactance with respect to the secondary winding and the other winding being designed for a relatively higher leakage reactance with respect to the secondary, and means for energizing said primary windings in parallel for starting the motor, the difference in the leakage reactances of the primary windings with respect to the secondary winding serving to produce a phase angle in the currents drawn by the primary windings during the starting period of the motor.

4. A single phase motor having a primary member with a winding for producing a flux wave having large non-fundamental component, a second primary winding disposed at an angle to the first mentioned winding for producing a substantially sinusoidal fundamental flux wave, means for energizing said windings in parallel for starting purposes, and a relatively rotatable secondary member having a winding which is responsive only to primary flux wave components which are of sinusoidal fundamental distribution.

5. A single phase motor having a primary member with a winding for producing a flux wave having a large non-fundamental component, a second primary winding disposed at an angle to the first mentioned winding for producing a substantially fundamental flux wave, means for energizing said windings in parallel for starting purposes, a relatively rotatable secondary member having a winding which is responsive only to primary flux wave components which are of fundamental distribution, and means for causing the primary member to produce fluxes of only substantially fundamental distribution for normal running purposes.

6. A single phase motor having main and starting windings disposed at an angle to each other and a relatively rotatable secondary winding and means for controlling the relative leakage reactance between the primary windings and the secondary winding between starting and running conditions so as to obtain a desired reactance phase split between the primary windings at start and a minimum leakage reactance for running.

7. A single phase motor having a primary with main and starting windings, the latter being of sinusoidal distribution and displaced at an angle to the main winding, the main winding being in two sections, one section consisting of a concentrated full pitch coil and the other section being distributed so as to produce a flux which when combined with the flux produced by the full pitch coil section gives a resultant flux of fundamental sinusoidal distribution, a relatively rotatable secondary having a winding responsive only to primary flux components of fundamental sinusoidal distribution, and means whereby only the full pitch coil section of the main winding is energized for starting and both sections of the main winding are energized in parallel for running.

8. A single phase motor having main and starting windings disposed at an angle to each other, a relatively rotatable secondary winding member, and means for reducing the leakage reactance between one of said primary windings and the secondary winding after the motor comes up to speed.

9. A single phase motor having a double section main primary winding and a primary starting winding displaced at an angle to the main winding, a relatively rotatable secondary winding member, means for connecting one section of the main winding in parallel with the starting winding to start the motor and both sections of the main winding in parallel for running, said main winding sections having the same effective number of turns but differently disposed on the same axis to produce different flux waves shapes, and serving as an adjustable reactance between starting and running conditions.

10. A single phase motor having relatively rotatable primary and secondary members, a main winding on the primary member made up of two sections, one consisting of a full pitch concentrated coil producing a square wave shape of flux, and the other consisting of a distributed winding on the same axis as the first section producing a flux which when combined with the square wave shape of flux results in a flux of substantially sine wave fundamental distribution, a starting winding on said primary distributed to produce a fundamental sine wave of flux at an angle to the fluxes of the main winding sections, the secondary having a winding consisting of electrically individual short-circuited coils between four-fifths and two-thirds pitch, and means for connecting only the full pitch coil section of the main winding in parallel with the starting winding for starting the motor and for connecting both main winding sections in parallel for running operation.

11. A single phase motor having a secondary winding member and a relatively rotatable primary winding having two windings displaced at an angle to each other, one of said windings being designed for low leakage reactance with respect to the secondary winding member and the other winding being designed for a relatively higher leakage reactance with respect to the secondary winding member, means for energizing said primary windings in parallel for starting the motor, the difference in the leakage reactances of the primary windings with respect to the secondary winding member serving to produce a phase angle in the currents drawn by the primary windings during the starting period of the motor, and a third winding on said primary member which when energized produces a flux which when combined with the flux of the high leakage reactance winding causes the high leakage reactance characteristic thereof to disappear, and means for cutting out the low leakage reactance winding of the primary and energizing the third primary winding for running.

12. A single phase motor having a primary member with a winding for producing a flux wave having a large non-fundamental component, a second primary winding disposed at an angle to the first mentioned winding for producing a substantially sinusoidal fundamental flux wave, means for energizing said windings in parallel for starting purposes, a relatively rotatable secondary member having a winding which is responsive only to primary flux wave components which are of sinusoidal fundamental distribution, a third winding on said primary member, which, when energized, produces a resultant substantially sinusoidal fundamental flux wave with the wave having the non-fundamental component, and means for energizing said third primary winding and disconnecting the second primary winding for running operation of the motor.

13. A single phase motor having main and starting primary windings displaced at an angle to each other, the main winding being wound in two sections having the same flux axis but producing fluxes of different wave shapes the resultant of which is substantially of sine wave fundamental distribution, a relatively rotatable secondary winding wound to be responsive only to primary flux waves of sinusoidal fundamental distribution, and means for energizing one section only of said main winding and the starting winding in parallel for starting the motor and only the two sections of the main winding in parallel for running, the section of the main winding which is energized for starting serving, in addition to contributing starting torque, as a reactance which produces a desired phase difference in the currents of the parallel connected windings at starting and reduces the starting current.

14. A single phase motor having a secondary core and winding and a relatively rotatable primary member having two primary windings displaced at an angle to each other and both being similarly inductively related to the secondary core, one of said primary windings being designed for low leakage reactance with respect to the secondary winding, and the other primary winding being designed for a relatively higher leakage reactance with respect to the secondary winding, means for energizing said primary windings in parallel for starting the motor, the difference in the leakage reactances of the primary windings with respect to the secondary winding serving to produce a phase angle in the currents drawn by the primary windings during the starting period of the motor, and means for cutting out the primary winding of high leakage reactance for running.

15. A single phase motor having a concentrated full pitch coil primary winding section and a primary winding section of sinusoidal distribution displaced at any angle to the full pitch coil section, a relatively rotatable secondary having a winding responsive only to primary flux components which are of sinusoidal fundamental distribution, and means for connecting the primary winding sections in parallel for starting purposes and cutting out the full pitch coil section for running purposes.

16. A single phase motor comprising a primary member provided with main and starting windings displaced at an angle to each other, the main winding being made in sections wound to produce fluxes of different wave shape and having circuit connecting means by which one section may be energized or both sections may be energized and so related that such change in connections serves as a variable reactance in the main winding circuit, a condenser in the starting winding circuit, and a relatively rotatable secondary member having a winding designed to cooperate with the main winding in producing the variation in reactance when said change in connections is made, the condenser and the reactance of the main winding serving at start to produce the desired phase split between the currents in the main and starting windings, and the circuit connecting means serving to reduce the reactance of the main winding for running operation.

17. A single phase motor having a primary member with primary windings displaced on axes at an angle to each other, a secondary member having a winding in inductive relation to the angularly displaced primary windings, and means for varying the relative inductive relationship between the primary and secondary windings in the different axes to control the operation of the motor.

18. In an alternating current motor, a primary winding having means for changing the shape of the flux wave produced thereby, and a secondary winding in inductive relation to said primary winding, said secondary winding having circuits so arranged that the inductive relationship between primary and secondary windings varies with the change in the primary flux wave shape independently of the magnitude of the primary flux.

WAYNE J. MORRILL.